(12) United States Patent
Keohane et al.

(10) Patent No.: US 7,499,988 B2
(45) Date of Patent: *Mar. 3, 2009

(54) METHOD FOR SAN-BASED BOS INSTALL VOLUME GROUP

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 871 days.

This patent is subject to a terminal disclaimer.

(21) Appl. No.: 10/687,240

(22) Filed: Oct. 16, 2003

(65) Prior Publication Data

US 2005/0083749 A1  Apr. 21, 2005

(51) Int. Cl.
*G06F 15/177* (2006.01)
(52) U.S. Cl. ............................ 709/221; 709/223; 707/10
(58) Field of Classification Search .................. 709/220
See application file for complete search history.

(56) References Cited

U.S. PATENT DOCUMENTS

| 5,860,001 | A  | * | 1/1999 | Cromer et al. .................. 713/1 |
| 6,304,965 | B1 | * | 10/2001 | Rickey ........................ 709/221 |
| 6,473,857 | B1 | * | 10/2002 | Panas et al. ..................... 713/2 |
| 6,532,535 | B1 | * | 3/2003 | Maffezzoni et al. ............. 713/1 |
| 6,532,538 | B1 | * | 3/2003 | Cronk et al. .................... 713/2 |
| 6,546,547 | B1 | * | 4/2003 | Runyan et al. ............... 709/220 |
| 6,834,299 | B1 | * | 12/2004 | Hamilton et al. ............ 709/220 |
| 6,854,072 | B1 | * | 2/2005 | Cagle et al. ................. 709/203 |
| 6,895,480 | B2 | * | 5/2005 | Heil ............................ 711/153 |
| 6,904,482 | B2 | * | 6/2005 | Rietze et al. ................ 710/107 |
| 6,965,989 | B1 | * | 11/2005 | Strange et al. .............. 709/220 |
| 6,966,058 | B2 | * | 11/2005 | Earl et al. .................... 709/223 |

(Continued)

OTHER PUBLICATIONS

M. Bancroft, N. Bear, J. Finlayson, R. Hill, R. Isicoff, and H. Thompson. Functionality and Performance Evaluation of File Systems for Storage Area Networks (SAN). In the Eighth NASA Goddard Conference on Mass Storage Systems and Technologies, 2000. <http://romulus.gsfc.nasa.gov/msst/conf2000/PAPERS/A05PA.PDF>.*
Chang-Soo Kim, Gyoung-Bae Kim, Bum-Joo Shin. "Volume Management in SAN Environment". ICPADS. Eight International Conference on Parallel and Distributed Systems. 2001. pp. 500-505.*

(Continued)

*Primary Examiner*—Jason D Cardone
*Assistant Examiner*—Jeffrey R Swearingen
(74) *Attorney, Agent, or Firm*—Diana R. Gerhardt; Dillon & Yudell LLP

(57) ABSTRACT

A method and system for providing storage area network SAN level boot/installation services for appliances on a SAN. A generic maintenance "bootlv" is mirrored on at least one disk (or set of disks) that are located out on the SAN. The disk(s) are encoded with similar boot functions as a conventional boot CD. The disk(s) provides physical storage for a volume group that has the base install images and all of the optional Programming Product (OPP) images selected by the system administrator to be included in the install volume group. In one embodiment, a volume group made up of several disks is able to boot up and run from any one of the several disks since the bootlv is mirrored/copied on each of the disks.

12 Claims, 5 Drawing Sheets

U.S. PATENT DOCUMENTS

| | | | |
|---|---|---|---|
| 7,089,300 B1 * | 8/2006 | Birse et al. | 709/221 |
| 7,107,330 B1 * | 9/2006 | Hamilton et al. | 709/221 |
| 7,376,717 B2 * | 5/2008 | Bhogal et al. | 709/220 |
| 7,386,711 B1 * | 6/2008 | Haimovsky et al. | 713/2 |
| 2003/0126242 A1 * | 7/2003 | Chang | 709/222 |

OTHER PUBLICATIONS

Wijayaratne, Ravi et al. "System support for providing integrated services from networked multimedia storage servers." Proceedings of the ninth ACM international conference on Multimedia. ACM Press, 2001. 270-279.*

* cited by examiner

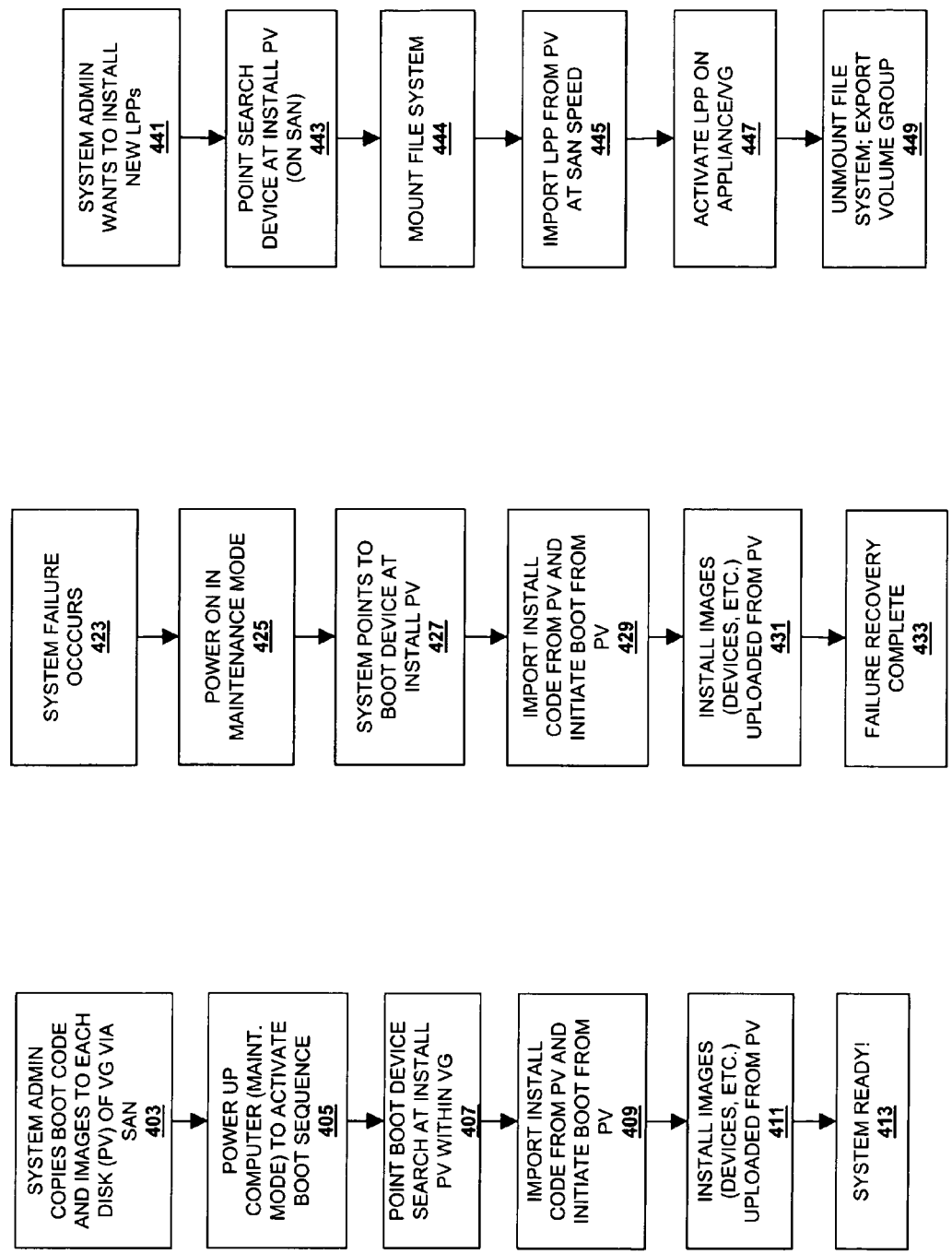

METHOD FOR SAN-BASED BOS INSTALL VOLUME GROUP

BACKGROUND OF THE INVENTION

1. Technical Field

The present invention relates in general to volume groups and in particular to volume groups on storage area networks (SAN). Still more particularly, the present invention relates to providing efficient base operating system (BOS) installation for a volume group of a SAN.

2. Description of the Related Art

Management of a computer system's physical memory, including distributed memory, involves dividing the physical memory into manageable sections, assigning physical addresses to those sections, and mapping those physical addresses to logical addresses. In some currently available computer systems, the management of the physical memory includes combining direct access storage devices (DASD) (also referred to as hard disks or physical volume (PV)) into groups called volume groups. Within each volume group, one or more logical volumes (LVs) are defined, which may be utilized for a number of system purposes, such as paging, storing raw data, or hosting a single file system.

Software known as logical volume managers (LVM), or simply volume managers, manages the fixed disk storage and the volume groups. The volume manager combines storage space on one or more hard disks into a single volume group and links the computer system's kernel to the volume group.

One example of a conventional LVM is the AIX LVM, which supports two volume group types: one with 32 disks and 256 logical volumes and one with 128 disks and 512 logical volumes, although further improvements are being made to accommodate larger numbers of disks and logical volumes. A volume manager such as AIX LVM provides virtualization between the physical disks and the user of the disk space such as a file system.

Each logical volume consists of one or more logical partitions (LPs), each corresponding to at least one physical partition, which is a fixed size region of space on a disk. If mirroring is specified for the logical volume, additional physical partitions are allocated to store the additional copies of each logical partition. These virtual logical disk devices appear to applications, databases, and file systems as if they where a physical disk device. However, a logical volume does not have the physical limitations of physical disk devices, and because of its virtual nature, a logical volume is not restricted to particular disks or a specific area of a disk. Data in logical volumes appears to be contiguous to the user but can be discontinuous on the physical volumes. This allows file systems, paging space, and other logical volumes to be re-sized or relocated, span multiple physical volumes, and have their contents replicated for greater flexibility and availability in the storage of data.

Because LVM is able to create logical volumes that appear contiguous in user space but which that map to discontinuous spaces on disks, the disks are not required to be physically located within the system executing the LVM. In fact, the disks are often located remote from the computer system on which the LVM is executing and accessed via a network. The LVM then enables a system administrator to activate a particular logical volume for use by the client systems. For example, a file system is hosted on a logical volume, and once the boot process completes, the file systems is available to be mounted by remote client systems via the network.

One network type that has combined the functionality of having multiple disk storage distributed across a network utilized for hosting file systems (and other applications) is a storage area network (SAN). Storage area networks are becoming more common in the computer network arena. A SAN comprises a network of storage disks that operate as a single resource and often links multiple servers together that each access the storage disks. An additional functionality of the SAN is that it enables data transfers between computers and disks at the same high peripheral channel speeds as when the two sets of components are coupled directly to each other. Thus, unlike conventional network file systems, which support client access to a file system over the Internet via transmission control protocol/Internet Protocol (TCP/IP), a SAN's file system appears as a directly connected storage device to the client, and the file system stored on a SAN is accessible without IP support. Also, although the storage disks may be located at different locations, a SAN allows the system administrator to access the various disks from a single boot location.

Access to and operation of a file system and logical volume requires a boot device that activates the SAN. Further, the logical volumes each have a boot image as well as images of other files, etc. that are to be installed in a file system. The boot installation of devices within a SAN may be completed via several different techniques. In one conventional method, a CD ROM is provided with a boot image having a base operating system (BOS). This method is limited to a single medium (typically 700 MB) or several similar media stacked together.

Currently, a boot device is identified in a nonvolatile random access memory (NVRAM), such as a CD or hard disk. Therefore, if a maintenance operation or installation requires the computer to boot from an alternative device, the identified device must be changed in NVRAM. For example, if an install operation is to be performed on a computer, an administrator may need to boot the computer from a removable medium, such as a compact disk (CD). Therefore, the administrator changes the boot disk in the computer to refer to a CD drive on the SAN.

In some conventional networks, a network install manager (NIM) is utilized to provide a network boot. With NIM, a first networked machine (server) requests the boot image from another server and installs individual pieces of software/products from the other server. Also, with NIM and with network file system (NFS), mounts installation/reading of the boot logical volume (bootlv) and installation of images in other networks occur at Internet Protocol (IP) speeds. This boot process requires the boot images and optional programming product OPP images be transmitted across the Internet in order to be installed and therefore incurred significant amounts of latency. Further, whenever the network is experiencing a down-time (i.e., network unavailable), NIM does not function and features such as disaster recovery cannot easily be accomplished.

Given the limitations of current implementations, which provide the boot image on a single removable CD that is also utilized to enable mounting of the file system, the present invention recognizes that it would be desirable to create a volume group with a boot Device that is more easily accessible than via NIM installation across an IP network. The invention further realizes that it would be beneficial to provide the boot device within the SAN and remove reliance from external devices that may not be accessible when required. These and other benefits are provided by the invention described herein.

SUMMARY OF THE INVENTION

Disclosed is a method and system for providing reliable and quickly accessible backup boot/installation devices for volume groups and file systems on a storage area network (SAN). The invention provides a copy of the boot image and the base install images on multiple disks (physical volume) within a volume group of the SAN.

A boot logical volume "bootlv" is provided with a generic maintenance boot image mirrored on at least one disk (or set of disks) located out on the SAN. The disk(s) are encoded with similar boot functions as a conventional boot CD. The disk(s) provide physical storage for a volume group that has the base install images and all of the Optional Programming Product (OPP) images selected by the system administrator to be included in the install volume group. The volume group is able to boot up and run from any one of the disks since the boot image is mirrored/copied on each of the disks. Each disk has a particular identifier (ID) and SAN address by which it may be differentiated from the other disks on the SAN.

When the system administrator boots the computer system, the administrator points the system BIOS boot path at an install volume group disk with the boot image on it. The computer system boots into maintenance mode, and the operating system (OS) then initiates the install process. The install process imports the install volume group and installs the base operating system (BOS) from an image (i.e., bos.rte) within the volume group. The BOS image may be in one of several formats. In AIX, the format is that of a file in a file system in the volume group. The format may also be a raw logical volume. In these cases, the BOS image may just be overwritten with a new BOS image. Also, the boot image may be replaced by writing a new boot image to the bootlv. Then, the install process proceeds to install the proper device and OPP support.

In another embodiment, following system failure or where the administrator attempts system recovery from a corrupted boot image on the primary disk, the administrator points the BIOS boot path at a disk with the install volume group, initiates a boot-up in maintenance mode, and then imports the primary root volume group to rebuild the boot image. A SAN-based volume group is thus allowed to quickly recover from failures, etc. without external software support.

Additionally, when the administrator desires to install new OPPs that is typically available from removable media, the administrator may import the install volume group, activate a mount of the file systems, and install the OPP image. Adding a new OPP to the volume group simply requires that those OPP image files be written to the mounted file system that contains the existing OPP images, and an update made to the table of contents file that exists for that file system. Following, the administrator un-mounts the file system and exports the volume group. Accordingly, base installation (bosinstall), failure recovery, and new OPP installation procedures are easily completed by importing a volume group and mounting file systems from within the volume group.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a flow chart illustrating the process of selectively utilizing one of multiple BOS devices provided on a SAN according to one implementation of the invention;

FIG. 5 is a flow chart illustrating the process of installing new OPPs from removable media to storage devices of a SAN according to one implementation of the invention; and FIG. 6 is a flow chart illustrating the process of completing recovery operations via an alternate boot device on the SAN according to one implementation of the invention.

DETAILED DESCRIPTION OF ILLUSTRATIVE EMBODIMENT(S)

The present invention provides a method and system for reliable and efficient boot up of a SAN-based volume group. by providing copies of base install images and a generic boot logical volume with a generic boot image on multiple disks (physical volumes) that make up the volume group. The boot image of the logical volume is copied and stored across the disks so that the disks look like a single device from a boot standpoint. During implementation, the installation process is made to point to a disk within the volume group, and the boot image for the appliance is copied from the disk within the volume group. The invention focuses on maintenance of volume groups and efficient (or fast) disaster/failure recovery. Three different implementations of the invention are provided, each corresponding to one of the flow charts described below.

Implementation of the invention does not limit the volume group to any particular size, and, in fact, the volume group is not even limited to a single medium. With the invention, a system administrator is able to initiate a boot process from any one of the disks within the volume group. The system administrator is also able to selectively switch from one disk to another among the multiple disks available within the volume group. This further allows the volume group to be activated without having to first mount the file system. From the perspective of the system being booted up, the activation process involves the system administrator identifying the volume group to the system and then loading the files from the selected disk(s) within the volume group to complete the boot process and install the files.

Figure 1:
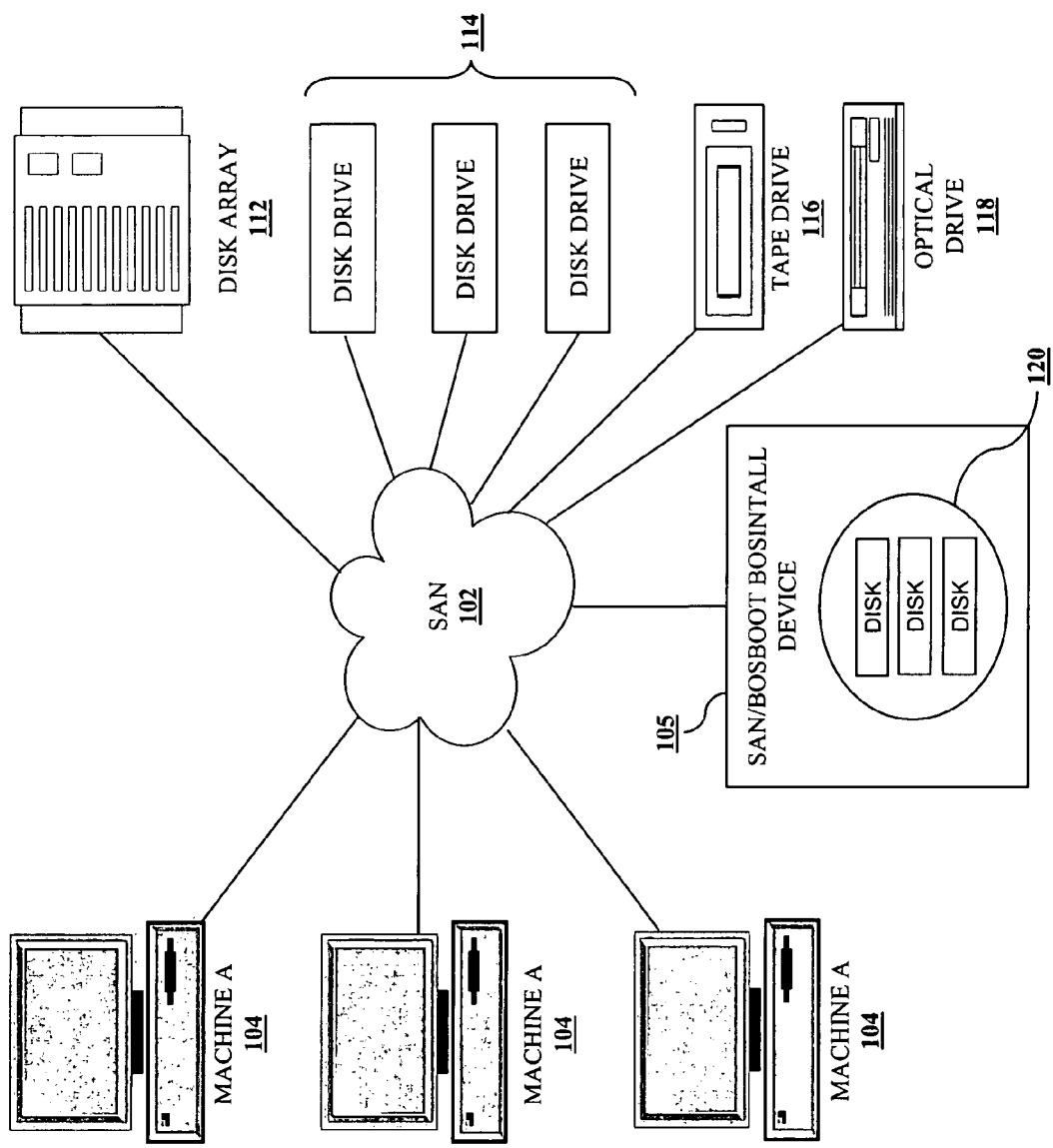
FIG. 1 depicts a pictorial representation of a storage area network (SAN) data processing system in which the present invention may be implemented.

With reference now to the figures, and in particular FIG. 1, which provides an illustration of a computer network comprising a storage area network (SAN) data processing system in which the present invention may be implemented. Computer network 100, which may appropriately be referred to as SAN 100, includes SAN data processing system (DPS) 105, (which in one embodiment, may be a SAN appliance), and SAN fabric 102, which is the medium used to provide communications links between various devices and computers connected together within SAN 100. SAN fabric 102 may include connections, such as wire, wireless communication links, or fiber optic cables. In the depicted example, SAN fabric 102 may be a fiber channel network, which is a high-speed transport technology utilized to build SANs. Of course, SAN 100 may also be implemented as a number of different types of networks, such as for example, an intranet, a local area network (LAN), or a wide area network (WAN). FIG. 1 is intended to serve solely as an example, and not as an architectural limitation for the present invention.

In the depicted example, SAN 100 includes machine A 104, machine B 106, and machine C 108, which may be servers and/or client workstations connected to SAN fabric 102. Also connected to SAN fabric 102 are a plurality of storage devices, including disk array 112, disk drives 114, tape drive 116, and optical drive 118. SAN 100 may include additional machines and other storage devices not shown. In some examples, thousands of such storage devices may be provided within SAN 100, particularly within the array 112 disks.

The invention is described from the perspective of a system manager performing boot up of SAN 100 and file systems stored on logical volumes of SAN 100. For simplicity of describing the invention, it is assumed that the server 120 is a SAN DPS 105 comprising a BOS boot image stored on at least one of the drives and utilized by the system administrator to complete the initial BOS install and other functional features of the invention. The invention is thus described with reference to the SAN DPS 105 (or simply SAN appliance) and boot operations controlled from SAN DPS 105. Specific configuration and operational features of a SAN appliance are described in the co-pending, related patent application Ser. No. 10/448,238, entitled "Method, Apparatus, and Program for Performing Boot, Maintenance, or Install Operations on a Storage Area Network," filed on May 29, 2003. The entire content of that application is hereby incorporated by reference.

Client systems (e.g., 104-108) may boot from boot devices in the SAN 100. For example Machine A 104 may boot from a disk or other removable medium within disk drives 114 or tape drive 116 or optical drive 118. The address of the boot device is stored in non volatile random only memory (NVRAM) within machine A and, according to the invention, the specific boot device utilized for machine A 114 may be changed.

In accordance with a one embodiment of the present invention, SAN BOSBoot/BOSInstall device (SAN boot device) 120 associated with SAN DPS 105 is connected to SAN fabric 102. Each SAN DPS 105 has a built in function that allows the operating system (OS) to inquire of the SAN DPS 105 what boot device is to be utilized. Other functional features of the SAN DPS 105 when operating as a SAN appliance are described in detail in the related patent application Ser. No. 10/448,238, which has been previously incorporated herein by reference. Several of those functional features are described below.

A system administrator may set the boot type for a machine to normal boot, install, or maintenance boot. This boot type may be stored in SAN boot device 120. The administrator also stores lists of boot devices, rootvg devices, primary devices, secondary devices, and non-essential devices in the SAN boot device 120. The initial program load (IPL) firmware and network adapter firmware of client systems 104-108 are modified to query SAN boot device 120 for a list of devices. The address or world wide name (WWN) of the SAN boot device is stored within the network adapter of the client systems 104-108. When performing a basic operating system (BOS) boot operation or install operation, the firmware within the specific client system 104-108 sends a query for boot devices to the SAN boot device 120. Thereafter, the firmware may send similar queries for root volume group (rootvg) devices, primary devices, secondary devices, and nonessential devices. The SAN boot device 120 listens for queries from machines on the SAN boot 100. When a boot query is received, SAN boot device 120 returns an appropriate list of boot devices based on the boot type. Similarly, the SAN boot device 120 may also return lists of rootvg devices, primary devices, secondary devices, or nonessential devices based on the query received from machines on the SAN 100.

Figure 2A:
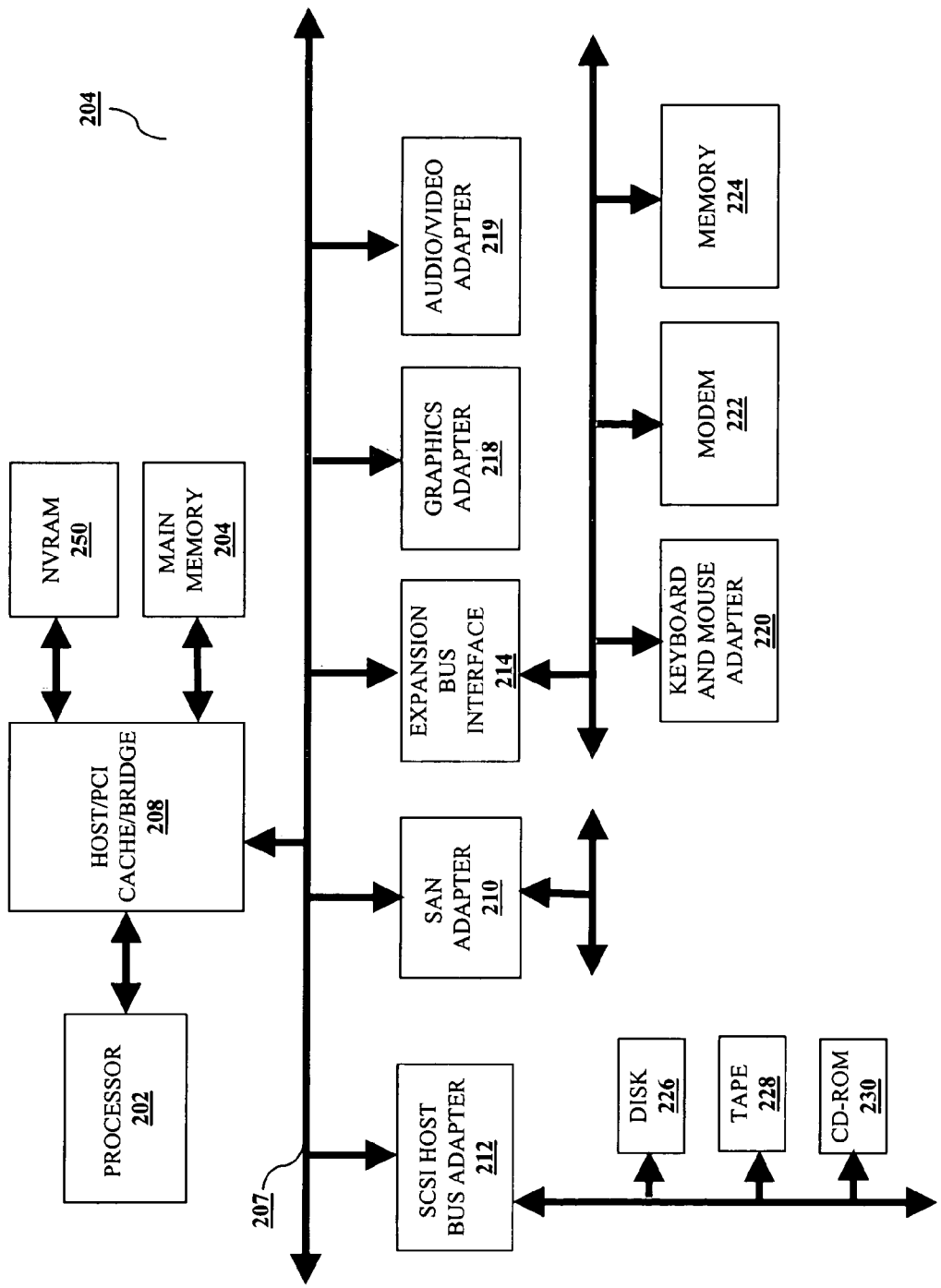
FIG. 2A is a block diagram illustrating internal components of a data processing system within which several features of the invention may advantageously be implemented.

With reference now to FIG. 2A, there is depicted a block diagram of a data processing system within which the present invention may be implemented. Data processing system 204 is an example of a client computer system and/or SAN DPS. Data processing system 204 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 206 are connected to PCI local bus 207 through PCI bridge 208. PCI bridge 208 also may include an integrated memory controller and cache memory for processor 202. Additional connections to PCI local bus 207 may be made through direct component interconnection or through add-in boards.

In the depicted example, SAN adapter 210, small computer system interface (SCSI) host bus adapter 212, and expansion bus interface 214 are connected to PCI local bus 206 by direct component connection. In contrast, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system (OS) runs on processor 202 and is used to coordinate and provide control of various components within data processing system 204 in FIG. 2. The operating system may be a commercially available operating system, such as Windows XP®, which is available from Microsoft Corporation. Instructions for the operating system, the object-oriented operating system, and applications or programs are located on storage devices, such as hard disk drive 226, and may be loaded into main memory 206 for execution by processor 202.

In an embodiment of the present invention, data processing system 200 boots from a device on a storage area network, completed via SAN adapter 210. Processor 202 loads boot code, also referred to as initial program load (IPL) firmware, from NVRAN 250. The boot code includes instructions for querying a SAN BOSboot/BOSinstall device for location of boot devices. When data processing system 200 is a client system, the boot/BOS install device is accessed via SAN adapter 210, which provides connection to a SAN DPS. When a SAN DPS BOS boot/install device is located within SAN adapter 210 or stored within memory 204. Firmware in SAN adapter 210 may include the world wide name (WWN) for the SAN storage device. Alternatively, the WWN for the SAN boot devices may be stored with the boot code in memory 204.

When performing a BOSboot operation or BOSinstall operation, the firmware sends an initial query for boot devices to the SAN boot device. Thereafter, the firmware may send similar queries for root volume group (rootvg) devices, primary devices, secondary devices, and non-essential devices. Thus, the present invention provides a dynamic mechanism for determining a set of devices to be configured for a given machine.

The depicted example in FIG. 2A and above-described examples are not meant to imply architectural limitations on the invention. Those of ordinary skill in the art will appreciate that the hardware configuration in FIG. 2A may vary depending on the implementation. For example, data processing system 204 also may be a notebook computer or hand held computer. Data processing system 204 also may be a kiosk or a Web appliance. Other internal hardware or peripheral devices, such as flash read-only memory (ROM), equivalent nonvolatile memory, or optical disk drives and the like, may be used in addition to or in place of the hardware depicted in FIG. 2A.

Figure 2B:
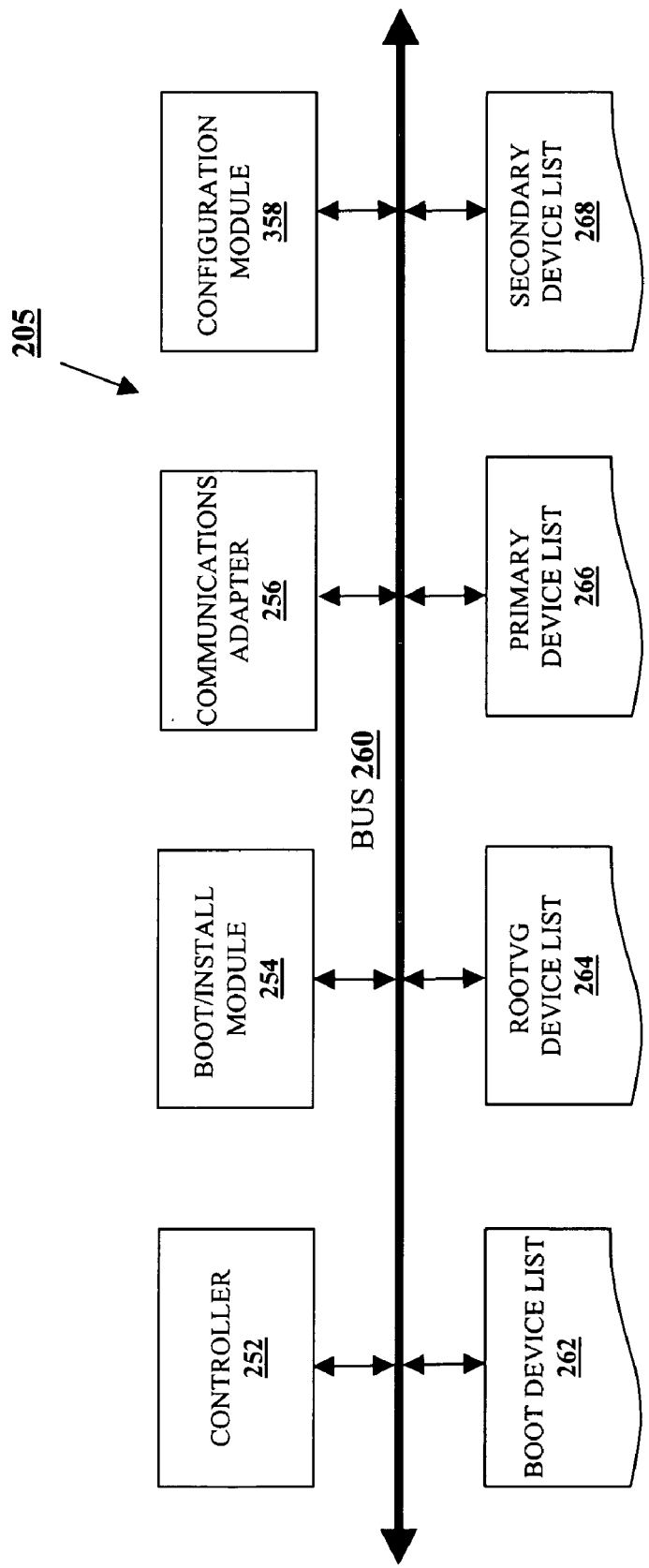
FIG. 2B is a block diagram illustrating major functional components of a data processing system utilized as a SAN appliance in accordance with one embodiment of the invention.

FIG. 2B is an exemplary block diagram of a SAN DPS with a SAN BOSboot/BOSinstall device in accordance with one embodiment of the present invention. SAN DPS 105 includes controller 252, boot/install module 254, communications (SAN) adapter 256, and configuration module 308. Communications adapter 316 may be a fibre channel adapter and is utilized for communicating with machines and devices on a SAN. SAN DPS 105 also stores boot device list 362, root volume group (rootvg) device list 264, primary device list 264, and secondary device list 266. More or fewer device lists may be stored within the scope of the present invention. For example, SAN DPS 250 may also store separate lists for normal boot devices, install boot devices, and maintenance boot devices.

The functional elements 252-258 and 262-268 are coupled to one another via the control/data signal bus 260. Any architecture that facilitates the communication of control/data signals between elements 252-258 and 262-268 may be used without departing from the spirit and scope of the present invention.

Controller 252 controls the overall operation of the SAN DPS 105 and orchestrates the operation of the other elements 254-258. With the operation of the present invention, boot/install module 254 allows the system administrator to point to a boot device stored on a physical disk within the volume group. SAN DPS 105 may also store a boot type for each machine in boot device list 262 or elsewhere. When a query for boot devices is received, boot/install module identifies the appropriate boot devices in boot device list 262 based on the boot type for the requesting machine. When a query for rootvg devices is received, the boot/install module returns a list of rootvg devices from rootvg device list 264.

Configuration module 258 instructs controller 252 to communicate with a machine to configure settings and to generate, update, delete, and modify device lists. For example, configuration module 258 may allow an administrator at a remote location to set a boot type for a specific machine or to add a device to the primary device list. In a preferred embodiment of present invention, configuration module 258 may include a Web server to provide a configuration interface through a Web browser at an administrator workstation.

The depicted example in FIG. 2B and above-description are not meant to imply architectural limitations. For example, SAN DPS 305 also may be a computer or server connected to the storage area network. The configuration module may also allow an administrator to set other options, such as the worldwide name (WWN) or address of the SAN DPS, a username and password for the SAN DPS, and an Internet-enabled small computer systems interface (Iscsi) adapter for connecting the disks over IP connection, etc.

Figure 3:
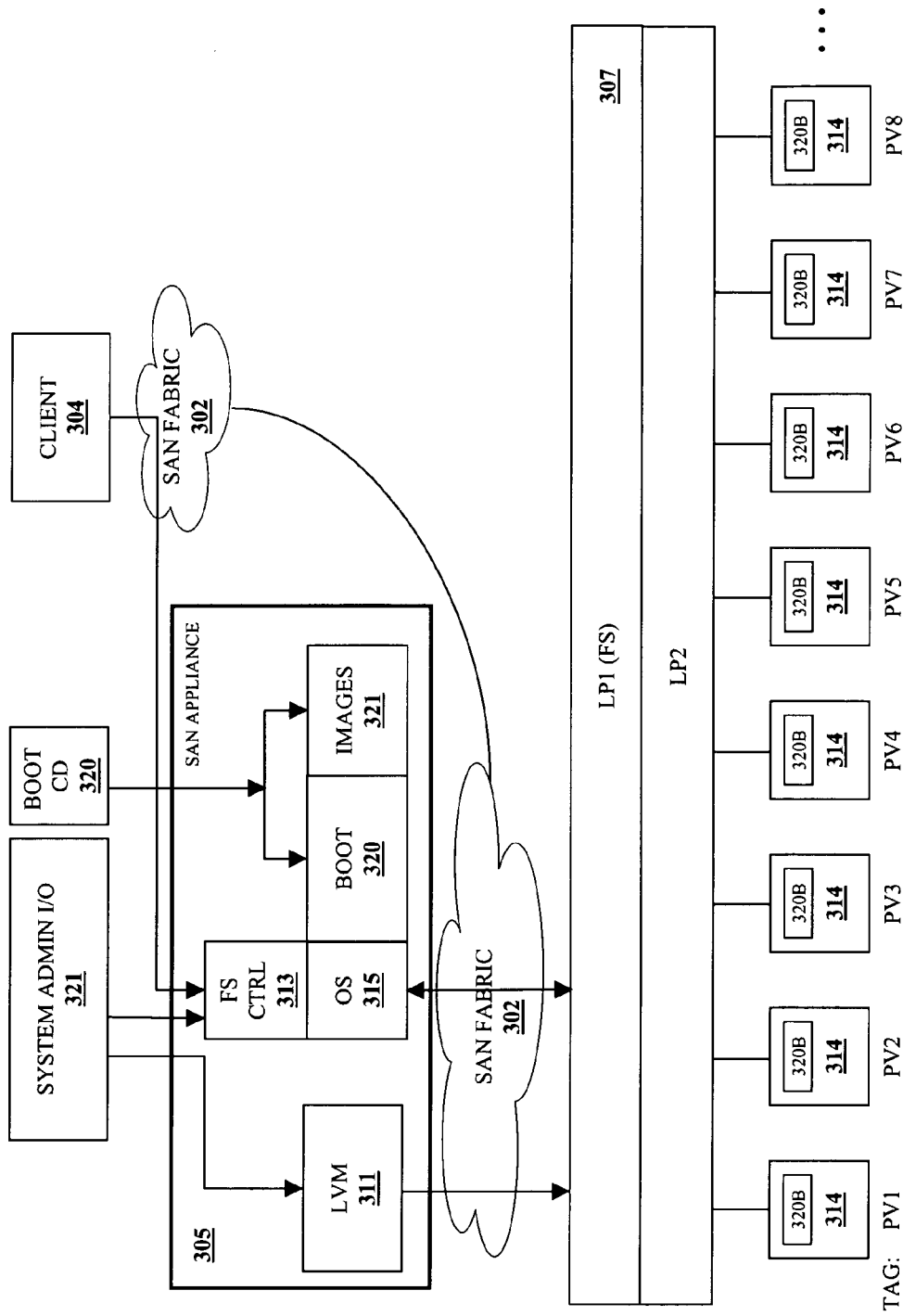
FIG. 3 is a block diagram of a volume group subsystem that includes a SAN system, a plurality of physical disks, and client system to one illustrative embodiment of the invention.

The invention comprises a method and system by which a generic maintenance boot image is copied and stored on at least one disk (or set of disks) that is located out on the SAN, and then utilized for one of three applications. In one embodiment, the boot image is provided via conventional LVM mirroring. However, with other implementations, the boot image is provided by building a number of boot images for each disk. The disk(s) may be encoded with similar boot functions as a conventional boot CD and provide physical storage for a volume group that has the base install images and all of the OPP images selected by the system administrator to be included in the install volume group. In one embodiment, a volume group made up of several disks is able to boot up and run from any one of the several disks that comprise the volume group since the bootlv is mirrored/copied on each of the disks. FIG. 3 provides more specific illustration of the functional components of a SAN DPS and interaction between the SAN DPS and the physical volumes, etc. to enable the functionality provided by the invention.

Turning now to FIG. 3, there is illustrated a multi-disk volume group sub-system that includes mirrored boot devices according to one implementation of the invention. The volume group 307 is shown having two logical partitions, LP1 and LP2. LP1 hosts a file system, which is accessible by users and a system administrator via SAN connections to client systems 304 and SAN DPS 305, respectively. Specifically, SAN fabric 302 provides the network connections for accessing the volume group 307. Within SAN DPS 305 is illustrated the hardware and software components utilized to access the volume group 307. These components include logical volume manager (LVM) 311, OS 315 and file system controller 313. Additionally, associated with OS 315 are boot device 320 and file images 321, both of which are mirrored in physical drives 314 of the volume group 307 as described below. A system administrator's input/output (I/O) device 321 is provided to enable the system administrator to set up the file system and volume group, install software on the volume group, and when required, point the boot process away from the boot CD (disk drive) 320 to one of the physical volumes 314 available over the SAN fabric 302. The I/O device 321 may be a client system with special permissions to enable system administrative updates or control of SAN DPS 305.

The volume group 307 is made up of multiple physical volumes 314, eight of which are shown labeled PV1 through PV8. The actual number of physical volumes is not as important to an understanding of the invention; however, the invention requires at least one physical volume 314 within the volume group 307 contain a copy of the boot software code and images. The volume group 307 is a software abstraction of the combination of physical volumes 314, which are combined and controlled by the LVM 311 to appear as a single congruent space. However, each disk retains its physical individuality and separate physical address, and the invention takes advantage of this fact by allowing the LVM 311 to (1) treat the physical disks as individual boot units over the SAN fabric 311 and (2) mirror boot code and images of the volume group 307 on the physical disks 314. As indicated by the boot image storage 320B within each physical volume 314, copies of the boot code are built or mirrored/stored on each one of the physical volumes 314 of the volume group 307, which is accessible via SAN fabric 302. As described below, this configuration of the physical volumes 314 enables the boot code and OPP images to be read relatively quickly from any one of the disks at SAN speeds, and thus the features of the described invention apply to all SAN environments.

Once the boot process has completed, and the file system is up and running, the client 304 is able to mount the file system (FS) on the volume group 307 by communicating with the FS controller 313 via the SAN fabric 302. Although described with reference to specific embodiments and configuration, it is understood that the system of FIG. 3 is provided solely for illustrative purposes and not meant to be limiting on the invention.

The invention operates within the above hardware, firmware and software configuration to provide a method and system for providing more reliable backup boot/installation services for DPSs on a storage area network (SAN). As shown in FIG. 3, the invention provides a boot image on every disk within a volume group of SAN. Copies of the base install images and a generic boot logical volume with a generic boot image are built or mirrored on multiple disks that make up the volume group. Once the copies have been made, the other processes of the invention may be implemented.

FIG. 4 is a flow chart illustrating the process of booting from one of the physical volumes of the volume group according to the invention. The process begins with the system administrator copying boot code to each (or some of the) disk that make up the volume group as shown at block 403. The system administrator accesses the SAN DPS and specifically the LVM and obtains a list of the physical volumes and their physical addresses. With this information, the system administrator selects one or more of the physical volumes/disks on which the boot code are to be mirrored or built. The administrator may choose to mirror/build the boot image on each of the physical disks; however, this may not be necessary when there are a large number of disks within the volume group, and only a few backup copies of the boot image are required. The copy of the boot image may be obtained from a physical CD-ROM boot disk or other removable type medium. Also, a special management GUI may be provided within the system administrative tools that allow the system administrator to select the physical volumes of the volume group and initiate the mirroring of the boot image and OPP image. Notably, the mirroring occurs at SAN speeds and is thus completed relatively quickly.

Returning to FIG. 4, the system administrator powers up the computer system as shown at block 405, and the computer goes into boot mode. That is, the computer system boots into maintenance mode, and when maintenance mode activates, the boot sequence generates a prompt for the system administrator to select a boot device. The system administrator selects a boot device on the volume group that is accessible via the SAN as shown at block 407. Each disk has a particular unique ID and SAN address by which it may be differentiated from the other disks on the SAN. The boot device is identified by a unique hardware identification (ID) utilized to select the device from among the list of physical volumes. The boot device selection feature is coded into the BIOS of the SAN DPS and, in one embodiment, provides the system administrator with a listing of install volume group disks with the boot image on them.

The computer system accesses the boot code on the selected physical volume via the SAN and initiates the boot and install processes from the physical volume as shown at block 409. The boot and install process imports the install volume group and installs the BOS image as indicated at block 411. The BOS image may be in one of several formats. In AIX, the format is that of a file in a file system in the volume group. The format may also be a raw logical volume. In these cases, the BOS image may just be overwritten with a new BOS image. Alternately, the boot image may be replaced by writing a new boot image to the bootlv. Then, the install process proceeds to install the proper device and OPP support. The system completes the boot and indicates system ready as shown at block 413.

In another embodiment, when the administrator wants to recover from a corrupted bootlv on the primary disk, the administrator simply directs the computer system at the correct disk with the install volume group, initiates a boot-up in maintenance mode, and then imports the primary root volume group to rebuild the boot image. FIG. 5 is a flow chart illustrating the process of completing disaster/failure recovery using the functionality of mirroring boot code on multiple disks with a volume group according to the invention. The mirroring of the boot code, etc. is completed as provided in the above description of FIG. 4. The failure recovery process is triggered responsive to the occurrence of a system failure as indicated at block 423. The system is then powered back on in maintenance mode as shown at block 425. The power on may be an automatic feature built into the OS or a manual feature initiated by a system administrator.

Following a system failure, the system may automatically point to the boot device on one of the install physical volumes across the SAN as indicated at block 427. The boot code is initiated from the physical volume across the SAN and the image files are imported into the system as shown at block 429. Then the images (device drivers, etc.) are installed on the computer system as shown at block 431. Following the system boots up in normal mode and failure recovery process completes as shown at block 433. The invention thus allows a SAN-based volume group to quickly recover from failures, etc. without external software support. In one embodiment, the disks are assigned a particular selection order in which they are accessed. During boot up, the first disk is accessed, and if the boot from the first disk fails, the second disk is automatically accessed, and so on.

FIG. 6 is a flow chart illustrating the process of installing new OPPs in a volume group (and/or DPS) using the functionality of mirroring boot code and images on multiple disks with a volume group according to one embodiment of the invention. The process begins when the system administrator desires to have new OPPs from removable media available for later install as shown at block 441. The system administrator points the search device at the physical volume to import the install volume group as shown at block 443. Then, the system administrator activates a mount of the file system as shown at block 444, and imports the OPP from the physical volume as indicated at block 445. This import of the OPP occurs via the SAN at SAN speed. Adding a new OPP to the volume group simply requires that those OPP image files be written to the mounted file system that contains the existing OPP images, and an update made of any table of contents files that exist for that file system. During installation, the installation code installs the products that is believed needed by the machine. The administrator may also select additional support to be installed prior to beginning the installation. After the BOS installation the administrator may import this volume group and install yet more products. The BOS provides support for automatic import, OPP install, and export of this volume group.

Returning to FIG. 6, the image is installed and the OPP activated on the SAN DPS as shown at block 447. Once the OPPs are installed, the system administrator un-mounts the file system and exports the volume group as indicated at block 449. The administrator may select a menu option of install and specify the BOS install volume group as the source. The administrator would also provide a list of products to install.

Following, the OS would import the volume group, mount the file system, install the products, dismount the file system, and export the volume group.

With the above three implementations, the invention provides base installation (BOSinstall), failure recovery, and new OPP installation procedures that now include importing a volume group and mounting file systems from the volume group. The advantage of the present invention is that the reading of the bootlv and installation of images occur at SAN speeds and not at internet protocol (IP) speeds as occurs with network install manager (NIM) or network file system (NFS) mounts. So boot images and OPP images are not being dragged across the internet to be installed on the DPS. Also, unlike with NIM systems which are rendered inoperable when the network is down, disaster recovery via the above SAN procedure is provided.

The invention further enables simultaneous use of a disk object by multiple different appliances connected to the volume group. This is possible because no single appliance has exclusive access to the group of disks making up the volume group and the boot image is mirrored on multiple disks within the volume group that may each be accessed by a different appliance. From a networked perspective, the invention provides a rotating set of disks that allows multiple systems to concurrently read the boot images. The volume group may also be opened as read only and take n reserve. The file system is mounted read only so that multiple machines may boot and install from the device concurrently. When utilized to provide new software support, the paths are updated and the updates are placed on the disk media before importing the new software packages.

One advantage of the present invention is that reading of the boot image and installation of images occur at SAN speeds and not at internet protocol (IP) speeds as occurs with network install manager (NIM) or network file system (NFS) mounts. Boot images and OPP images do not have to be dragged across the Internet to be installed on the appliance. Also, unlike with NIM systems, which are rendered inoperable when the network is down, immediate disaster recovery via the above SAN procedure is available.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives, CD-ROMs and DVD ROMs, and transmission type media such as digital and analog communication links, and wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. In a storage area network (SAN) computer system having a volume group made up of one or more physical disks, a method for providing SAN boot devices, said method comprising:
    storing a boot image from a primary boot device on at least one disk within said volume group;
    copying boot install images from said first boot device to multiple disks within the volume group, whereby each disk of said multiple disks within said volume group may independently serve as the boot device for the SAN system and a boot process may be initiated for the SAN system from any one of the multiple disks in the volume group, wherein the SAN system is a single, bootable computer system;
    switching a boot sequence from a first boot device, which corresponds to the primary boot device and is external to said volume group, to the at least one disk within said volume group, wherein said switching step comprises:
        monitoring for an occurrence of a predefined condition on said SAN system; and
        initiating said switching when one of a plurality of said predefined condition occurs, wherein said predefined conditions include: (1) receiving an error signal from the first boot device when a boot up is desired; (2) being unable to access said first boot device when the boot up is desired; (3) encountering a failure on said SAN computer system that results in a shut down of said system; and (4) system administrative directive to re-boot system from a selected one of said at least one disk;
    subsequently completing a full boot of the SAN system from the boot image stored on the at least one disk, wherein the SAN system's boot operation is completed from within said volume group, rather than from the primary boot device, from which the boot image is copied to the at least one disk;
    reading of the boot image at SAN speed, wherein further no boot images are pulled from across the network;
    installing images from the boot logical volume at said SAN speed; and
    wherein when one of a system failure and a system recovery from a corrupted boot image on a primary disk occurs, said switching further comprises:
        booting up the SAN system in maintenance mode;
        generating a prompt for a system administrator to select the boot device from among a displayed list of available boot devices; and
        automatically encoding the identification and routing information of the selected boot device in a BIOS (basic input/output system) path for accessing the boot device to complete a boot of the SAN system, wherein the boot device selected is the at least one disk within the volume group.

2. The method of claim 1, wherein said storing step comprises:
    selecting the at least one physical disk on which to copy the boot install images;
    selecting particular boot install images to copy to said at least one physical disk, wherein less than all of said boot install images may be selected for copying.

3. The method of claim 1, wherein said storing step further comprises:
    building the boot image on a computer system associated with said SAN; and
    uploading the boot image to said logical volume.

4. The method of claim 1, further comprising:
selecting a first one of said at least one physical disk as a first boot disk from which said boot process is to be completed; and
when a subsequent boot from the selected first boot disk fails and there are additional disks within the logical volume, automatically selecting a second boot disk to complete the boot process, wherein said automatic selecting selects a subsequent boot device based on a pre-established selection order for selecting SAN boot devices when one of the set of predefined conditions occur.

5. The method of claim 1, wherein responsive to an occurrence of a corrupted boot logical volume (LV) on a primary boot disk, said method comprises:
pointing the system at the install volume group; and
initiating an boot installation process to import the install volume group and install the base operating system (BOS) image, which in turn installs the proper devices and optional OPP support desired.

6. The method of claim 1, wherein, when an administrator desires to install new optional programming parameters (OPPs), said method further comprises:
importing the install volume group;
mounting the file system hosted on said volume;
installing the OPP images;
updating a table of contents file for the file system;
dismounting the file system; and
exporting the volume group.

7. A storage area network (SAN) data processing system, comprising:
SAN fabric connection;
an input/output (I/O) device;
a logical volume comprised of one or more physical storage devices that are accessible on the SAN via the SAN fabric connection;
a processor;
program means/code executing on the processor to provide a series of management functions associated with the logical volume, said program means including:
means for providing a copy of a boot device on at least one of the storage devices in said logical volume, wherein said copy enables a complete boot of said SAN system from within the logical volume at SAN speed;
program code for selecting the at least one physical storage device on which to copy the boot install images;
program code for selecting particular boot install images to copy to said at least one physical storage device, wherein less than all of said boot install images may be selected for copying;
program code for copying boot install images from said first boot device to multiple storage devices within the volume group, whereby each storage device of said multiple storage devices within said volume group may independently serve as the boot device for the SAN system and a boot process may be initiated from any one of the multiple storage devices in the volume group, wherein the SAN system is a single, bootable computer system; and
program code for updating a table that provides a list of all boot devices accessible to said SAN system, including each storage device to which a the boot install image is copied;
means for switching a boot sequence from a first boot device to the at least one disk within said volume group, wherein the first boot device corresponds to a primary boot device from which the boot image is copied to the at least one disk and is external to said volume group; and
means for booting said SAN system by installing images from the boot logical volume at said SAN speed, rather than from the primary boot device;
program code for monitoring for an occurrence of a predefined condition on said SAN system;
program code for initiating said switching when one of a plurality of said predefined condition occurs, wherein said predefined conditions include; (1) receiving an error signal from the first boot device when a boot up is desired; (2) being unable to access said first boot device when the boot up is desired; (3) encountering a failure on said SAN computer system that results in a shut down of said system; and (4) system administrative directive to re-boot system from a selected one of said at least one disk;
program code for booting up the SAN system in maintenance mode;
program code for generating a prompt for a system administrator to select the boot device from among a displayed list of available boot devices; and
program code for automatically encoding the identification and routing information of the selected boot device in a BIOS (basic input/output system) path for accessing the boot device to complete a boot of the SAN system, wherein the boot device selected is the at least one disk within the volume group.

8. The SAN system of claim 7, wherein each storage device has a unique ID, said SAN system further comprising:
a BIOS; and
a mechanism for powering said SAN system on and off, wherein a boot is initiated by said BIOS from a boot image stored on said at least one storage device whenever the SAN system is turned on from an off state.

9. The SAN system of claim 7, further comprising program code for:
enabling selection of a first one of said at least one physical disk as a first boot disk from which said boot process is to be completed; and
when a subsequent boot from the selected first boot disk fails and there are additional disks within the logical volume, automatically selecting a second boot disk to complete the boot process, wherein said automatic selecting selects a subsequent boot device based on a pre-established selection order for selecting SAN boot devices when one of the set of predefined conditions occur.

10. The SAN system of claim 7, wherein responsive to an occurrence of a corrupted boot logical volume (LV) on a primary boot disk, said system further comprises program code for:
pointing the system at the install volume group; and
initiating an boot installation process to import the install volume group and install the base operating system (BOS) image, which in turn installs the proper devices and optional OPP support desired.

11. The SAN system of claim 7, wherein when an administrator desires to install new optional programming parameters (OPPs), said system further comprises program code for:
importing the install volume group;
mounting the file system hosted on said volume;
installing the OPP images;

updating a table of contents file for the file system;
dismounting the file system; and
exporting the volume group.

12. A computer program product, comprising:
a tangible computer readable storage medium; and
program code stored on said computer readable storage medium that when executed by a processor enables a system administrator to access a boot device and copy boot install images from the boot device to a physical disk on a SAN for which a logical volume is provided, wherein said physical disk serves as a boot device for said logical volume during subsequent boot;
wherein said program code further comprises code for:
    storing a boot image from a boot device on at least one disk within said volume group;
    selecting a default boot device from among available boot devices, wherein a boot device within the logical volume is selected and a path to said default device is automatically encoded in the BIOS path;
    switching a boot sequence from a first boot device to the default boot device within said volume group, wherein the first boot device corresponds to a primary boot device from which the boot image is copied to the at least one disk and is external to said volume group;
    booting up the SAN system in maintenance mode;
    generating a prompt for a system administrator to select the boot device from among a displayed list of available boot devices; and
    automatically encoding the identification and routing information of the selected boot device in a BIOS (basic input/output system) path for accessing the boot device to complete a full boot of the SAN system, wherein the boot device selected is the at least one disk within the volume group;
    displaying a graphical user interface (GUI), wherein said GUI displays a list of available boot install devices and enables a system administrator to manually select which device among the list of available boot install devices to utilize as a boot install device, and wherein further said GUI enables a system administrator to set up a physical volume to receive a copy of said boot image;
    monitoring for an occurrence of a predefined condition on said SAN system; and
    initiating said switching when one of a plurality of said predefined condition occurs;
wherein said predefined conditions include; (1) receiving an error signal from the first boot device when a boot up is desired; (2) being unable to access said first boot device when the boot up is desired; (3) encountering a failure on said SAN computer system that results in a shut down of said system; and (4) system administrative directive to re-boot system from a selected one of said at least one disk; and
subsequently completing a full boot the SAN system from the boot image stored on the at least one disk, wherein the SAN system's boot operation is completed from within said logical volume.

* * * * *